Figure 1:
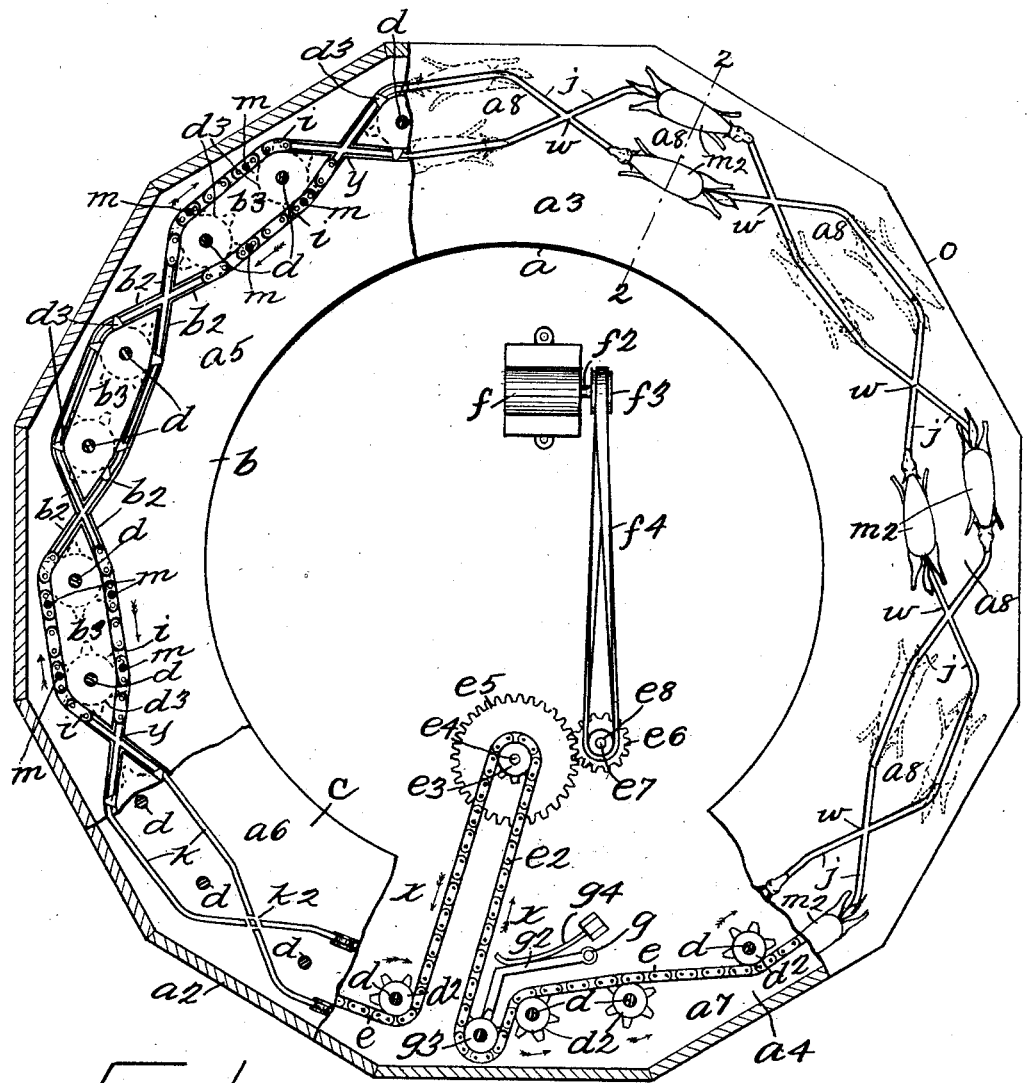

No. 826,758. PATENTED JULY 24, 1906.
C. F. WEIDNER.
MERRY-GO-ROUND.
APPLICATION FILED SEPT. 15, 1904.

3 SHEETS—SHEET 1.

WITNESSES
F. A. Stewart
C. E. Mulreany

INVENTOR
BY Charles F. Weidner
Edgar Tate & Co.
ATTORNEYS

THE NORRIS PETERS CO., WASHINGTON, D. C.

No. 826,758. PATENTED JULY 24, 1906.
C. F. WEIDNER.
MERRY-GO-ROUND.
APPLICATION FILED SEPT. 15, 1904.
3 SHEETS—SHEET 2.
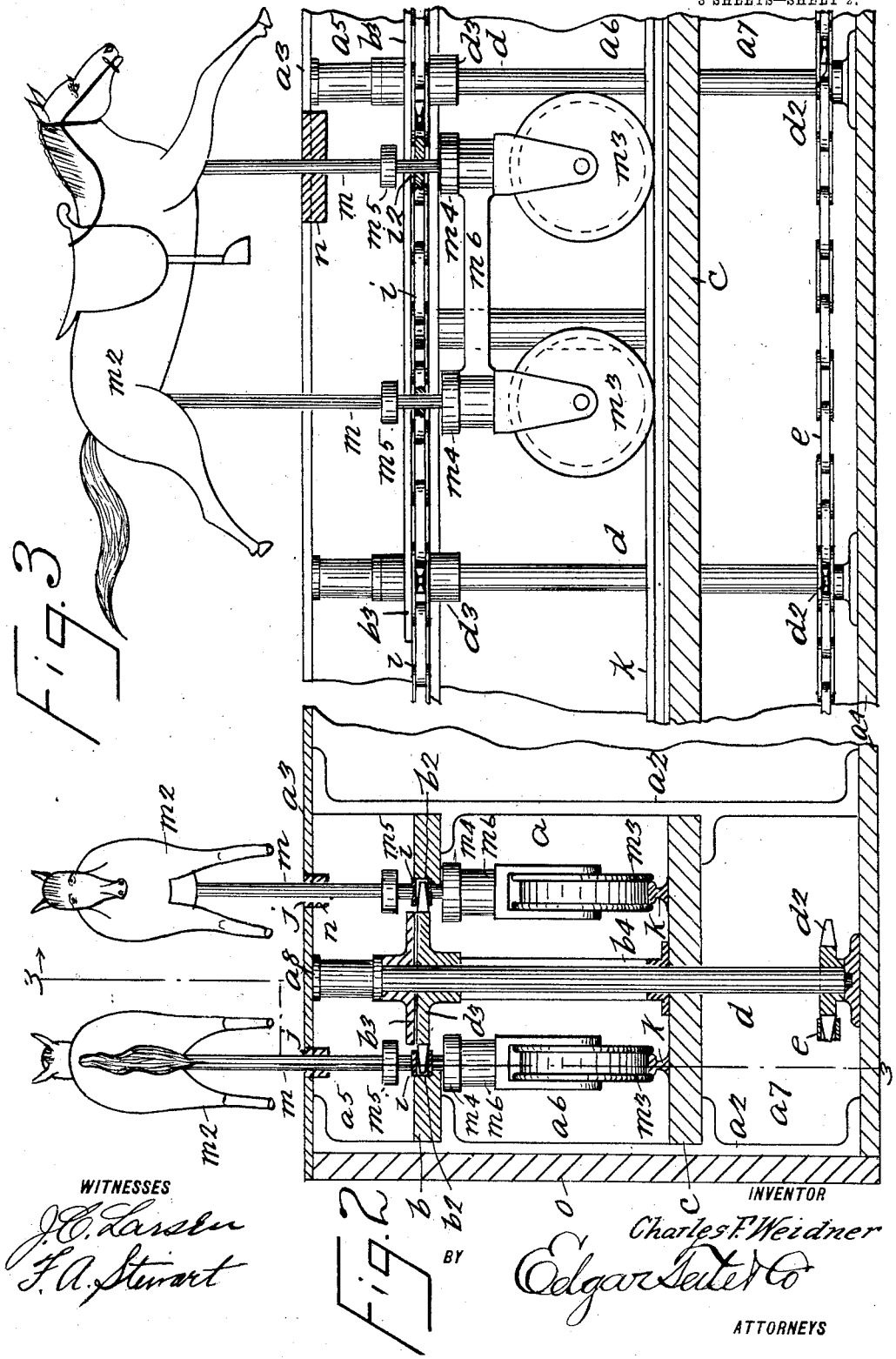
WITNESSES
J. C. Larsen
F. A. Stewart
INVENTOR
Charles F. Weidner
BY Edgar Tate & Co.
ATTORNEYS No. 826,758. PATENTED JULY 24, 1906.
C. F. WEIDNER.
MERRY-GO-ROUND.
APPLICATION FILED SEPT. 15, 1904.

3 SHEETS—SHEET 3.

WITNESSES
J. C. Larsen
F. A. Stewart

INVENTOR
Charles F. Weidner
BY Edgar Tate & Co
ATTORNEYS

THE NORRIS PETERS CO., WASHINGTON, D. C.

UNITED STATES PATENT OFFICE.

CHARLES F. WEIDNER, OF NEW YORK, N. Y.

MERRY-GO-ROUND.

No. 826,758.　　　　Specification of Letters Patent.　　　　Patented July 24, 1906.

Application filed September 15, 1904. Serial No. 224,481.

*To all whom it may concern:*

Be it known that I, CHARLES F. WEIDNER, a citizen of the United States, residing at New York, in the county of New York and State of New York, have invented certain new and useful Improvements in Merry-Go-Rounds, of which the following is a specification, such as will enable those skilled in the art to which it appertains to make and use the same.

This invention relates to that class of pleasure devices or apparatus known as "merry-go-rounds" or "carousels;" and the object thereof is to provide an improved device or apparatus of this class which involves supports for horses or other animals or seats vertically arranged and movable in opposite directions approximately in a circle through tracks which cross each other at regular intervals, a further object being to provide a device or apparatus of the class specified the operation of which is designed to give pleasure and amusement to children and others; and with these and other objects in view the invention consists in a device or apparatus of the class specified constructed as hereinafter described and claimed.

This invention is an improvement on that described and claimed in an application for Letters Patent of the United States filed by me November 19, 1903, Serial No, 180,373, and is fully disclosed in the following specification, of which the accompanying drawings form a part, in which the separate parts of my improvement are designated by suitable reference characters in each of the views, and in which—

Figure 6:
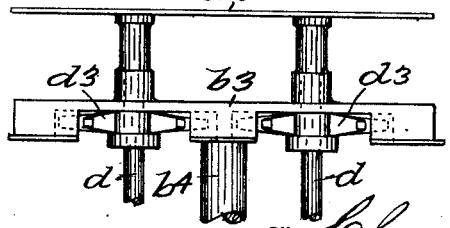
Figure 4:
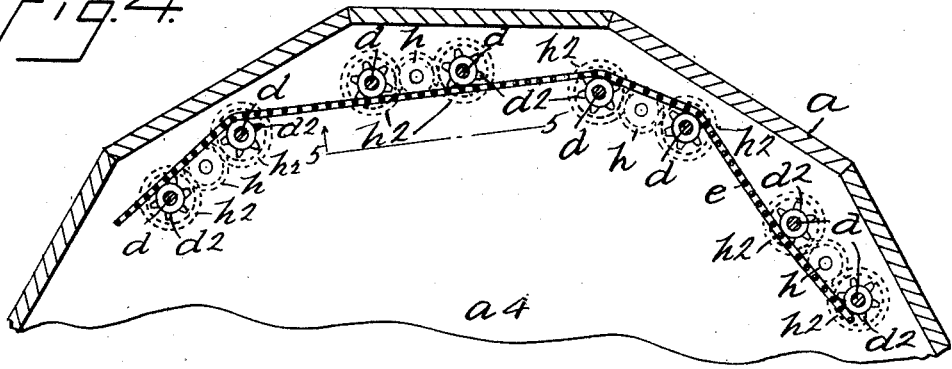
Figure 5:
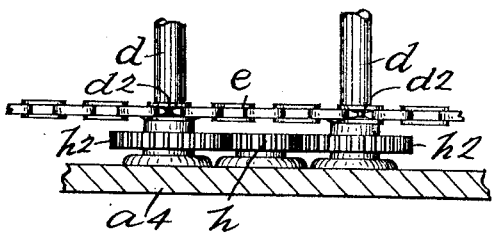
Figure 7:
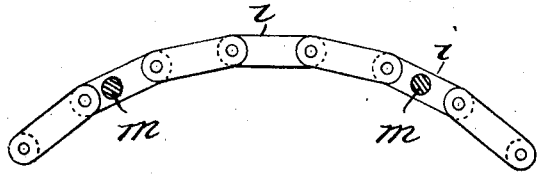

Figure 1 is a plan view of the apparatus which constitutes this invention, various parts thereof being broken away to better show the construction; Fig. 2, a partial section on the line 2 2 of Fig. 1; Fig. 3, a partial section on the line 3 3 of Fig. 2; Fig. 4, a view of part of the apparatus similar to that shown in Fig. 1, but showing a modification; Fig. 5, a partial section on the line 5 5 of Fig. 4; Fig. 6, a side view of a detail of the construction, and Fig. 7 a plan view of a length of chain which I employ.

In the accompanying drawings, Figs. 2, 3, 5, 6, and 7 are on a larger scale than Figs. 1 and 4.

In the practice of my invention I provide an apparatus of the class specified comprising a substantially annular base $a$, composed in the form of construction shown of two upright and substantially circular portions $a^2$, having a top plate or cover $a^3$ and two horizontal partitions or platforms $b$ and $c$ and resting on a base or support $a^4$ of any preferred kind or class, and by means of the platforms or partitions $b$ and $c$ the annular base $a$ is divided into a top compartment $a^5$, a central compartment $a^6$, and a bottom compartment $a^7$.

Within the annular base $a$ are mounted a plurality of pairs of vertically-arranged shafts $d$, each of which is provided at its lower end with a sprocket-wheel $d^2$, and passing around these separate pairs of sprocket-wheels $d^2$ in the manner shown is a drive-chain $e$, which is so arranged as to turn the alternate pairs of shafts $d$ in opposite directions, and this chain is carried inwardly at one side of the base portion in the form of construction shown and as shown at $e^2$ in Fig. 1 and passed around a sprocket-wheel $e^3$, mounted on a vertically-arranged shaft $e^4$, which is provided with a gear-wheel $e^5$, which meshes with a pinion $e^6$ on a vertically-arranged shaft $e^7$, provided with a pulley $e^8$, and placed in the inclosure formed by the annular base portion $a$ is a motor $f$, the shaft $f^2$ of which is provided with a pulley $f^3$, which is geared, in connection with the pulley $e^8$, on the shaft $e^7$ by a belt $f^4$. It will be observed that the motor $f$ and the shafts $e^4$ and $e^7$, with their gearing, are all arranged within the central inclosure formed by the annular base $a$, and by means of the motor $f$ and the gearing in connection therewith the drive-chain $e$ may be driven or is driven in practice in the direction of the arrows $x$ of Fig. 1, or, if desired, the said drive-chain may be driven in the opposite direction.

In passing the chain $e$ around the separate pairs of shafts $d$ the said chain is passed on the inner side of one pair of said shafts and on the outer side of the adjacent pair of said shafts, and this arrangement is continued entirely around the base portion $a$ of the apparatus, and in this way the alternate pairs of shafts $d$ are turned in opposite directions. Pivoted at $g$ adjacent to the inwardly-directed loop-shaped portion $e^2$ of the chain $e$ is a crank-arm $g^2$, provided with a sprocket-wheel $g^3$, around which the chain $e$ is also passed, and a strong spring $g^4$ bears on the arm $g^2$ and forces it outwardly, the object of this arrangement being to take up any slack in the chain $e$ occasioned by the wear thereof in the operation of the apparatus. If desired, however, the separate pairs of shafts $d$ may be geared together, as shown in Figs. 4 and 5, this gearing being made by means of a gear-wheel $h$, mounted between each pair of said shafts, and corresponding gear-wheels $h^2$, secured on said shafts, and by means of this construction the separate pairs of shafts $d$ may be caused to operate regularly notwithstanding a slight wear in or stretching of the chain $e$.

The partition or platform $b$ in the annular base portion $a$ is provided with two circularly-arranged and serpentine tracks or ways $b^2$ at the opposite sides of the separate pairs of shafts $d$ and which cross each other between said pairs of shafts, and mounted in these tracks or ways are pairs of short drive-chains $i$, (clearly shown in Fig. 1 and also shown in Figs. 2 and 3,) and these pairs of drive-chains $i$ equal in number one-half the number of pairs of shafts $d$. The tracks or ways $b^2$ divide the platform or partition $b$ into outer and inner members and intermediate members $b^3$, and each pair of shafts $d$ pass through one of these intermediate members $b^3$ of the partition or platform $b$. One of the intermediate members $b^3$ of the partition or platform $b$ is shown in detail or in side view in Fig. 6, and the shafts $d$ are also provided with sprocket-wheels $d^3$, which operate in connection with the short drive-chains $i$ and which fit in corresponding recesses in the bottoms of the intermediate members $b^3$ of the said platform or partition $b$, as clearly shown in Figs. 1 and 6, and said intermediate members $b^3$ are supported by posts $b^4$, mounted on the platform or partition $c$, and one of which is shown in Figs. 2 and 6.

In Fig. 1 of the accompanying drawings the top plate $a^3$ is broken away to show the horizontal partition or platform $b$, and the partition or platform $b$ is broken away to show the partition or platform $c$, and said partition or platform $c$ is broken away to show the base or bottom $a^4$ and the sprocket-wheels $d^2$ on the shafts $d$, together with the chain $e$ and the gearing by which it is driven. The separate pairs of shafts $d$ are mounted on the base or bottom portion $a^4$ of the apparatus and pass vertically through the partition or platform $c$ and through the intermediate parts $b^3$ of the partition or platform $b$ and are free to turn on or in the said members $a^4$, $c$, and $b^3$. The top plate $a^3$ is also provided with two circularly-arranged and serpentine slots $j$, which correspond in position with the tracks or ways $b^2$ in the partition or platform $b$ and are directly over said tracks or ways, and the said slots $j$ cross each other between the separate pairs of shafts $d$ in the same manner as the tracks or ways $b^2$, and the crossing of the slots $j$ in the top plate $a^3$ form detached portions $a^8$ of said top plate or cover $a^3$, which are supported in the form of construction shown on the parts $b^3$ of the partition or platform $b$, and this connection may be made in any desired manner.

Placed on the partition or platform $c$ are two circularly-arranged and serpentine tracks or rails $k$, which are arranged in the same manner as the tracks or ways $b^2$ and which cross each other in the same manner as said tracks or ways, as shown at $k^2$ in Fig. 1, and the separate pairs of shafts $d$ pass vertically between these tracks or rails $k$ between the crossings thereof, and mounted on the tracks or rails $k$ and passing vertically through the tracks or ways $b^2$ and upwardly through the slots $j$ in the top plate or cover $a^3$ are rods or supports $m$, consisting of shafts, with the upper ends of which are connected horses, as shown at $m^2$, or any other suitable animals or seats of any kind or class. The shafts which constitute the supports $m$ are provided at their lower ends in the form of construction shown with grooved wheels $m^3$, which travel on the rail $k$, and directly below the platform or partition $b$ with collars $m^4$ and above said partition or platform with collars $m^5$; but these collars are not absolutely necessary and may or may not be employed, the only object thereof being to aid in securing a steady and even movement of the upright supports $m$. The upright supports $m$ also pass through the short drive-chains $i$, two of said supports being employed in connection with each of said chains in the form of construction shown, and the collars $m^4$ and $m^5$ are placed below and above said chains, and said chains are connected with said supports $m$ in such manner that the movement of said chains around the tracks or ways $b^2$ will carry the supports $m$ therewith. As above stated, two of the supports $m$ are connected with each of the short drive-chains $i$ and passed vertically through the links thereof, and the lower ends of these shafts or supports are connected by a truck $m^6$, in which the grooved wheels $m^3$ are mounted.

The short drive-chains $i$ may be made in any desired manner, and the links thereof through which the supports $m$ pass may also be made in any desired manner, and in the operation of the apparatus the sprocket-wheels $d^3$ operate in connection with the separate pairs of short drive-chains $i$, and the said drive-chains are carried entirely around the annular base of the apparatus, the separate chains of each pair being made of such length that they are caught by the sprocket-wheels $d^3$ of one pair of the shafts $d$ before they leave the sprocket-wheels $d^3$ of another pair, and said chains cross the tracks of each other between the separate pairs of shafts $d$ and sprocket-wheels $d^3$ or at the points designated in Fig. 1 by the reference character $y$, and by reason of this construction the horses $m^2$ or any other seats connected with the supports $m$ are moved in opposite directions over the top plate or cover $a^3$ in tracks which cross each other at regular intervals, as shown at $w$ in Fig. 1, this movement being an inward and an outward movement in their respective courses, the general form of which is circular, and by reason of this arrangement a party or parties sitting on the horses $m^2$ or on any other seats or carriages mounted on the supports $m$ are always moved in opposite directions along lines which cross each other at regular intervals, whereby a very pleasing and exciting sensation is produced. I may also connect with the supports $m$ below the top plate or cover $a^3$ plates, collars, or other devices $n$, having longitudinal top members movable in the slots $j$ and which will in the operation of the apparatus form pilots or guides to aid the supports $m$ in making the crossings in the tracks or ways $b^2$ at $y$ and also in making the crossings at $w$ of the slots $j$ in the top plate or cover $a^3$; but these devices are not absolutely necessary and may or may not be employed.

My invention is not limited to the exact details of construction herein shown and described, as it will be apparent that the tracks or ways $b^2$ may be formed in various ways and the short pairs of drive-chains $i$ may be supported by different means, and other changes in and modifications of the construction herein described may be made without departing from the spirit of my invention or sacrificing its advantages.

It will also be apparent that instead of driving the separate pairs of shafts $d$ in opposite directions by means of the drive-chain $e$ other forms of gearing may be employed for this purpose and operated by any suitable mechanism within the annular base $a$.

It will also be understood that in practice the central part of the apparatus is covered, and this cover forms a platform over the operative mechanism on which people may stand; but in Fig. 1 of the accompanying drawings this cover is cut out to better show the construction.

In Figs. 1 and 2 the outer part $a^2$ of the annular or circular base member is also inclosed by a boxing or housing $o$; but this forms no part of my invention, and in practice the entire apparatus will be inclosed by a platform leading up to or on a level with the top plate or cover $a^3$.

Having fully described my invention, what I claim as new, and desire to secure by Letters Patent, is—

1. An apparatus of the class described, comprising an annularly-arranged casing or base provided with a top plate, two circularly-arranged and serpentine tracks placed within said casing and crossing each other at regular intervals and open at the top and bottom, said top plate being also provided with circularly-arranged and serpentine slots which cross each other at regular intervals, short drive-chains mounted in said tracks or ways, supplemental tracks or ways mounted beneath the first-named tracks or ways and crossing each other at regular intervals, trucks mounted on said supplemental tracks or ways and provided with supports which pass upwardly through said drive-chains and through the slots in the top plate and a plurality of which are connected with each of said trucks and with each of said chains, and means for moving said chains through and around said tracks or ways in opposite directions, substantially as shown and described.

2. An apparatus of the class described, comprising an annularly-arranged casing or base provided with a top plate, two circularly-arranged and serpentine tracks placed within said casing and crossing each other at regular intervals and open at the top and bottom, said top plate being also provided with circularly-arranged and serpentine slots which cross each other at regular intervals, short drive-chains mounted in said tracks or ways, supplemental tracks or ways mounted beneath the first-named tracks or ways and crossing each other at regular intervals, trucks mounted on said supplemental tracks or ways and provided with supports which pass upwardly through said drive-chains and through the slots in the top plate and a plurality of which are connected with each of said trucks and with each of said chains, and means for moving said chains through and around said tracks or ways in opposite directions, consisting of vertically-arranged shafts mounted in said casing and arranged in pairs between said tracks or ways and the crossing thereof, sprocket-wheels connected with each pair of said shafts and operating in connection with said chains, and means for turning said separate pairs of shafts in opposite directions, substantially as shown and described.

3. An apparatus of the class described, comprising an annular casing or base provided with a top plate, two circularly-arranged and serpentine tracks placed within said casing and crossing each other at regular intervals and open at the top and bottom, said top plate being also provided with circularly-arranged and serpentine slots which cross each other at regular intervals, short drive-chains mounted in said tracks or ways and provided with vertically-arranged supports which pass upwardly through the slots in the top plate and a plurality of which are connected with each of said chains, and means for moving said chains through and around said tracks or ways in opposite directions, consisting of vertically-arranged shafts mounted in said casing and arranged in pairs between said tracks or ways and the crossings thereof, sprocket-wheels connected with each pair of said shafts and operating in connection with said chains, and means for turning said separate pairs of shafts in opposite directions, consisting of sprocket-wheels connected with said shafts, a motor arranged within said casing, and a drive-chain operating in connection with the last-named sprocket-wheels of all of said shafts and geared in connection with said motor, substantially as shown and described.

4. An apparatus of the class described, comprising an annular casing or base having a top plate and horizontal partitions, the top plate being provided with a circularly-arranged and serpentine slots which cross each other at regular intervals and the first horizontal partition being provided with circularly-arranged and serpentine tracks or ways which cross each other at regular intervals, and the bottom horizontal partition being provided with circularly-arranged and serpentine tracks which cross each other at regular intervals; a plurality of pairs of drive-chains mounted in the tracks or ways of the first horizontal partition, vertically-arranged shafts arranged in pairs and passing vertically between the said tracks or ways and between the crossings thereof; sprocket-wheels connected with said pairs of shafts and operating in connection with said chains; vertically-arranged supports, a plurality of which are connected with each of said chains and passed therethrough, and the lower ends of which are connected by trucks provided with wheels which rest on the said tracks on the bottom horizontal partition; said supports being also passed upwardly through the slots in the top plate and means for turning the separate pairs of shafts in opposite directions, substantially as shown and described.

5. In an apparatus of the class described, a plurality of main endless tracks arranged in the same horizontal plane and crossing each other at intervals, supplemental tracks arranged under the main tracks and corresponding therewith, short drive-chains mounted in the main tracks, trucks mounted on the supplemental tracks and provided with supports which pass upwardly through the corresponding chains in the main tracks, and means for moving said chains through said tracks, substantially as shown and described.

6. In an apparatus of the class described, a plurality of main endless tracks arranged in the same horizontal plane and crossing each other at intervals, supplemental tracks arranged under the main tracks and corresponding therewith, short drive-chains mounted in the main tracks, trucks mounted on the supplemental tracks and provided with supports which pass upwardly through the corresponding chains in the main tracks, and means for moving said chains through said tracks, said main tracks being also provided with a cover having slots which correspond with said main tracks and through which said supports pass, substantially as shown and described.

In testimony that I claim the foregoing as my invention I have signed my name, in presence of the subscribing witnesses, this 14th day of September, 1904.

CHARLES F. WEIDNER.

Witnesses:
F. A. STEWART,
C. E. MULREANY.